United States Patent
Yu (10) Patent No.: US 10,450,023 B2
(45) Date of Patent: Oct. 22, 2019

(54) BICYCLE SADDLE MANUFACTURING METHOD

(71) Applicant: VELO ENTERPRISE CO., LTD., Taichung (TW)

(72) Inventor: Tsai-Yun Yu, Taichung (TW)

(73) Assignee: VELO ENTERPRISE CO., LTD., Taichung (TW)

( * ) Notice: Subject to any disclaimer, the term of this patent is extended or adjusted under 35 U.S.C. 154(b) by 0 days.

(21) Appl. No.: 15/017,990

(22) Filed: Feb. 8, 2016

(65) Prior Publication Data
US 2016/0311486 A1    Oct. 27, 2016

(30) Foreign Application Priority Data
Apr. 23, 2015    (TW) .............. 104113112 A (51) Int. Cl.
| | |
|---|---|
| *B29C 44/56* | (2006.01) |
| *B29C 45/00* | (2006.01) |
| *B29C 51/08* | (2006.01) |
| *B29C 44/34* | (2006.01) |
| *B62J 1/00* | (2006.01) |

(Continued)

(52) U.S. Cl.
CPC ................ *B62J 1/26* (2013.01); *B29B 11/02* (2013.01); *B29B 11/14* (2013.01); *B29C 44/02* (2013.01); *B29C 44/5636* (2013.01); *B29C 45/0055* (2013.01); *B29C 45/14* (2013.01); *B29C 51/00* (2013.01); *B29C 51/082* (2013.01); *B29C 51/14* (2013.01); *B62J 1/22* (2013.01); *B29C 43/36* (2013.01); *B29C 44/3484* (2013.01); *B29C 44/5681* (2013.01); *B29C 51/02* (2013.01); *B29C 51/16* (2013.01); *B29C 2045/0079* (2013.01); *B29K 2023/06* (2013.01); *B29K 2023/083* (2013.01); *B29K 2105/04* (2013.01); *B29K 2105/20* (2013.01); *B29K 2105/253* (2013.01); *B29K 2713/00* (2013.01);

(Continued)

(58) Field of Classification Search
CPC ........ B29C 70/48; B29C 44/06; B29C 70/76; B29C 51/02; B62J 1/00; B62J 1/18; B32B 31/18; B29L 2031/3094; B29J 2700/634; B29K 2105/253; B29K 2023/083; B29K 2023/06
USPC .......... 264/153, 45.5, 261; 297/215.16, 219; 156/79
See application file for complete search history.

(56) References Cited

U.S. PATENT DOCUMENTS

| | | | |
|---|---|---|---|
| 4,026,600 A | 5/1977 | Kutaguchi | |
| 4,781,774 A * | 11/1988 | Steward | ................ B29C 44/22 156/221 |

(Continued)

FOREIGN PATENT DOCUMENTS

| | | |
|---|---|---|
| DE | 102013206727 | 10/2014 |
| DE | 102013206727 A1 | 10/2014 |
| EP | 1919683 | 12/2009 |

*Primary Examiner* — Michael N Orlando
*Assistant Examiner* — Christian Roldan
(74) *Attorney, Agent, or Firm* — Browdy and Neimark, PLLC (57) ABSTRACT

A bicycle saddle manufacturing method includes the steps of expanding a foamable material to form the foamable material into a semi-finished saddle body, and performing a thermoforming process to form the semi-finished saddle body into a saddle in a forming mold. As a result, the bicycle saddle manufacturing method of the present invention can avoid waste of material and environmental pollution.

5 Claims, 8 Drawing Sheets

(51) Int. Cl.
*B62J 1/26* (2006.01)
*B29C 51/00* (2006.01)
*B29C 45/14* (2006.01)
*B62J 1/22* (2006.01)
*B29B 11/02* (2006.01)
*B29B 11/14* (2006.01)
*B29C 44/02* (2006.01)
*B29C 51/14* (2006.01)
*B29C 51/02* (2006.01)
*B29C 51/16* (2006.01)
*B29K 23/00* (2006.01)
*B29K 105/04* (2006.01)
*B29K 105/20* (2006.01)
*B29K 105/00* (2006.01)
*B29L 31/30* (2006.01)
*B29L 9/00* (2006.01)
*B29C 43/36* (2006.01)

(52) U.S. Cl.
CPC . *B29L 2009/001* (2013.01); *B29L 2031/3094* (2013.01); *B62J 1/00* (2013.01)

(56) References Cited

U.S. PATENT DOCUMENTS

| | | | |
|---|---|---|---|
| 5,108,076 | A | 4/1992 | Chiarella |
| 5,714,108 | A * | 2/1998 | Girardi ............ B29C 44/027 156/85 |
| 6,030,035 | A | 2/2000 | Yates |
| 6,059,359 | A | 5/2000 | Cassani |
| 6,066,277 | A * | 5/2000 | Lee ............ B29C 44/0407 264/271.1 |
| 6,095,601 | A | 8/2000 | Yu |
| 6,290,794 | B1 | 9/2001 | Yates |
| 6,409,865 | B1 | 6/2002 | Yates |
| 7,022,275 | B2 * | 4/2006 | Bigolin ................ B62J 1/00 264/153 |
| 8,128,164 | B2 * | 3/2012 | Segato ............... B62J 1/007 297/202 |
| 2010/0045084 | A1 * | 2/2010 | Segato ............... B62J 1/007 297/195.1 |
| 2013/0174971 | A1 | 7/2013 | Cassani |

* cited by examiner

| Expand a foamable material to form the foamable material into a semi-finished saddle body |

↓

| Perform a thermoforming process to form the semi-finished saddle body into a saddle |

BICYCLE SADDLE MANUFACTURING METHOD

BACKGROUND OF THE INVENTION

1. Field of the Invention

The present invention relates generally to bicycle saddles and more particularly, to a bicycle saddle manufacturing method.

2. Description of the Related Art

A conventional bicycle saddle primarily includes an elastomer made of foam material such as expanded ethylene-vinyl acetate (hereinafter referred to as EVA) or expanded polyethylene (hereinafter referred to as PE), and a cover cloth covering the elastomer, which is usually a net fabric, a synthetic plastic leather, or other kinds of cloth. In addition, there is a hard shell mounted to the bottom of the elastomer for supporting of the whole saddle, and the shell is adapted to be connected with a seat post of the bicycle through other elements.

Germany Patent Number DE102013206727 disclosed a bicycle saddle manufacturing method including the steps of cutting an expanded foam block by machining, such as milling, grinding, and so on, to make the foam block become a semi-finished saddle body shaped similar to the saddle, and heating the semi-finished saddle body in a mold to shape it as the saddle by thermoforming. Specifically speaking, the semi-finished saddle body is shaped into the elastomer of the bicycle saddle by thermoforming.

However, in the bicycle saddle manufacturing method provided by the aforesaid patent, many y unnecessary parts of the foam block should be cut off in the process of cutting the foam block into the semi-finished saddle body, resulting in waste of material and environmental pollution.

SUMMARY OF THE INVENTION

The present invention has been accomplished in view of the above-noted circumstances. It is an objective of the present invention to provide a bicycle saddle manufacturing method, which can avoid waste of material and environmental pollution.

To attain the above objective, the present invention provides a bicycle saddle manufacturing method which includes the steps of:

a) expanding a foamable material to form the foamable material into a semi-finished saddle body; and b) performing a thermoforming process to form the semi-finished saddle body into a saddle in a forming mold.

In the bicycle saddle manufacturing method of the present invention, the semi-finished saddle body is not formed by cutting, so the present invention doesn't cause waste of material and environmental pollution.

Preferably, the semi-finished saddle body may be combined with a woven cloth in the thermoforming process in the step b), so that the saddle is provided at a bottom thereof with the woven cloth. In this way, the woven cloth enhances the structural strength of the saddle, especially the tensile strength for resisting lateral tensile force.

In addition, the semi-finished saddle body may be combined with a cover cloth in the thermoforming process in the step b), so that the saddle is provided at a top thereof with the cover cloth. This way of disposing the cover cloth is very easy; and the cover cloth can be fixed firmly. The semi-finished saddle body may be combined with the woven cloth and the cover cloth simultaneously in a single mold. Alternately, the semi-finished saddle body may be combined with the woven cloth in a mold, and then combined with the cover cloth in the same mold or in another mold.

As to the step a), the step a) may be performed by foam injection molding. In more detail, the foamable material that is not yet expanded and adapted for injection molding is injected into a preforming mold and expanded in the preforming mold in the step a). Alternately, the foamable material may be a foamable sheet which is not yet expanded; in the step a) the foamable material is disposed in a preforming mold and expanded in the preforming mold. In another embodiment, the foamable material may be made by injection molding, or cut from a large foamable board which is not yet expanded.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

First of all, it is to be mentioned that same reference numerals used in the following preferred embodiments and the appendix drawings designate same or similar elements throughout the specification for the purpose of concise illustration of the present invention.

Figure 1:
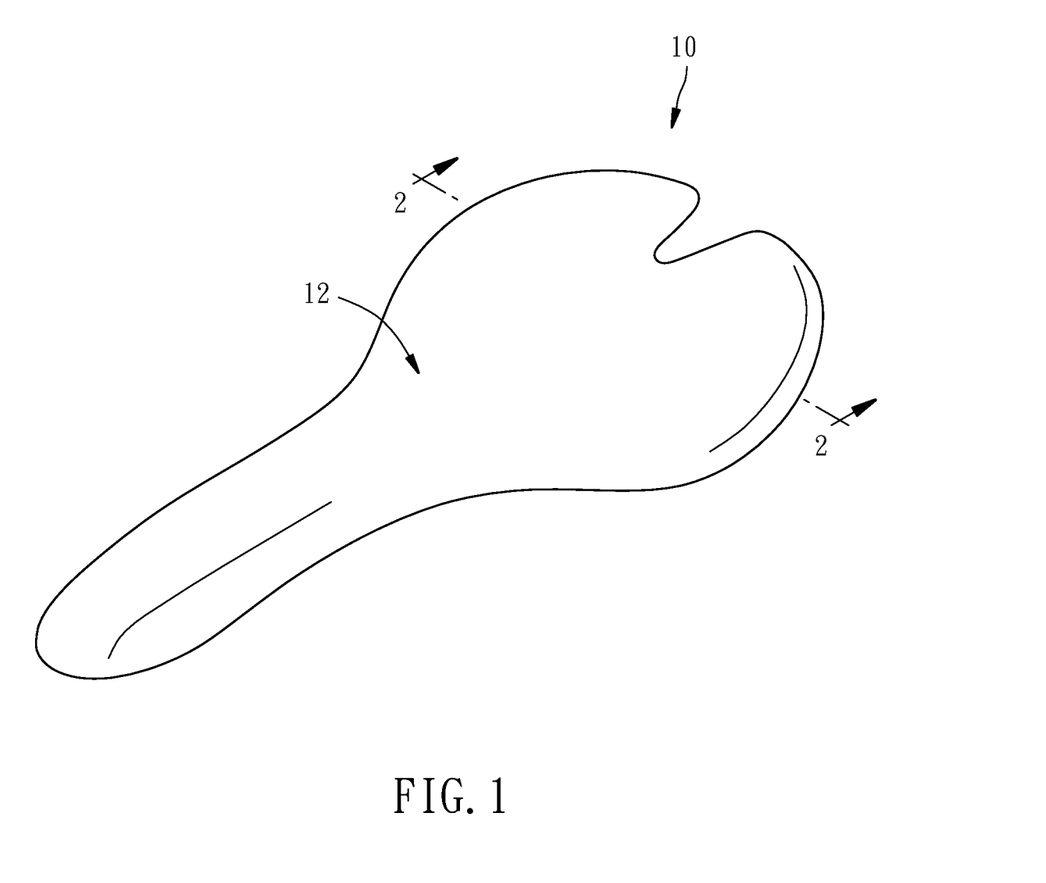
FIG. 1 is a perspective view of a saddle made by a bicycle saddle manufacturing method according to a first preferred embodiment of the present invention.
Figure 2:
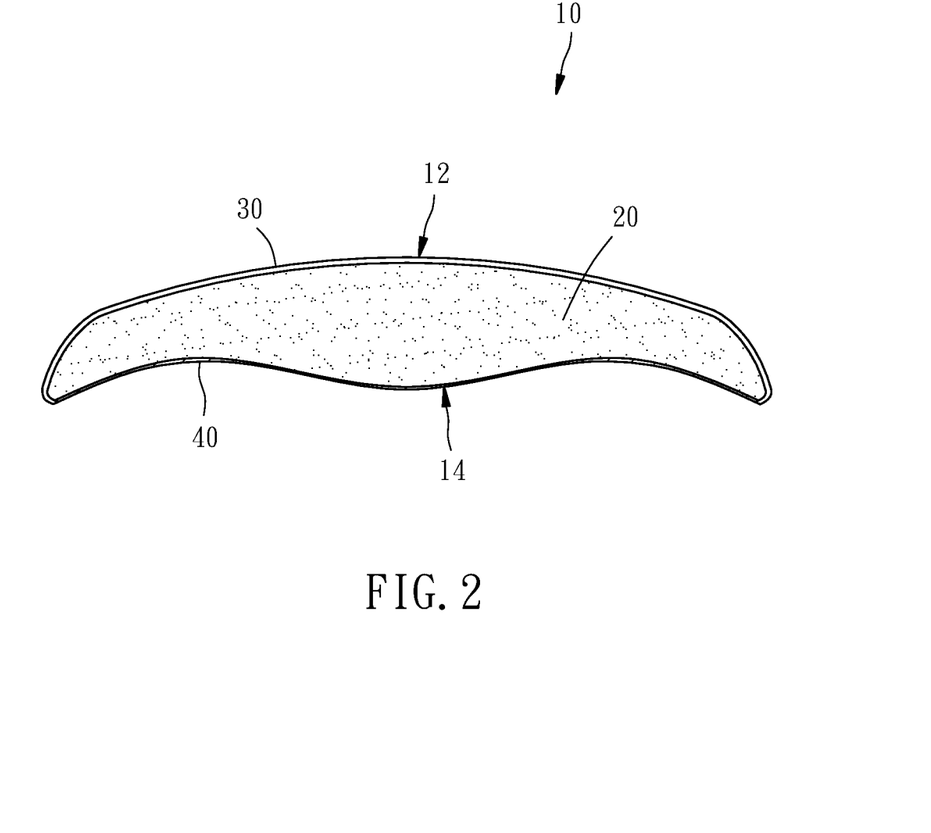
FIG. 2 is a sectional view taken along the line 2-2 in FIG. 1.

Referring to FIGS. 1-2, a bicycle saddle manufacturing method according to a first preferred embodiment of the present invention is adapted for manufacturing a saddle 10 which primarily includes an elastomer 20. The material of the elastomer 20 is foam, which is usually closed cell foam, such as EVA or PE, for providing the elastomer 20 ability of cushion and support. In addition, the saddle 10 in this embodiment further includes a cover cloth 30 such as a net fabric, a synthetic plastic leather, and so on, and a woven cloth 40 such as gauze, and so on. The cover cloth 30 is located at the top 12 of the saddle 10 for contacting the rider. The woven cloth 40 is located at the bottom 14 of the saddle 10 for enhancing the structural strength of the saddle 10.

Figure 3:
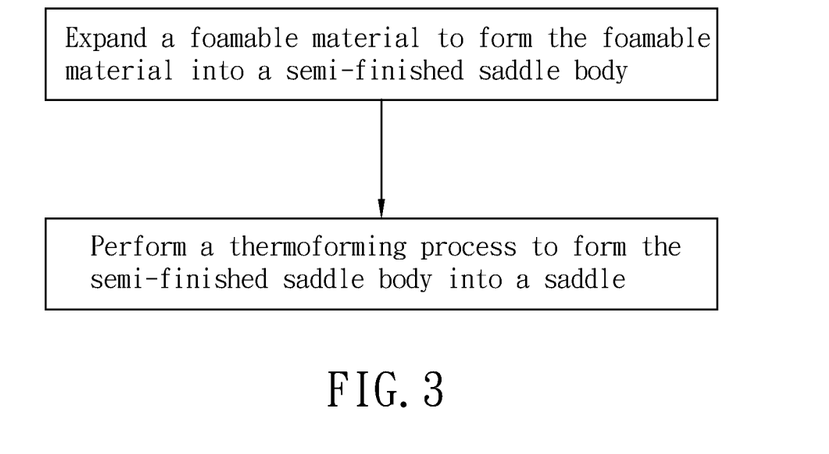
FIG. 3 is a flow chart of the bicycle saddle manufacturing method of the present invention.

Referring to FIGS. 3-6, the method of the saddle 10 includes the following steps.

a) Expand a foamable material to form the foamable material into a semi-finished saddle body 50.

Figure 4:
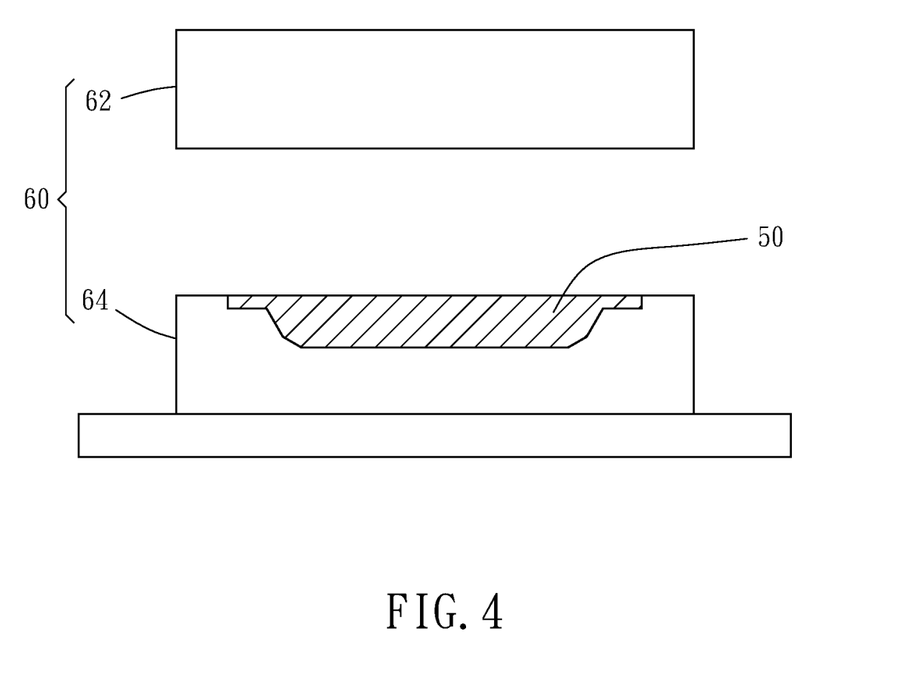
FIG. 4 is a schematic sectional view showing the step a) of the bicycle saddle manufacturing method according to the first preferred embodiment of the present invention.

Specifically speaking, the semi-finished saddle body 50 is to be formed into the elastomer 20 in the following step b). The foamable material is made of a mixture of a plastic material such as EVA, PE, and so on, a foaming agent, and other additive. For example, the foamable material may, but not limited to, be made as a foamable sheet which is shaped similar to the saddle 10 but only sized as approximately half of the saddle 10. After that, the foamable material (sheet) is disposed in a preforming mold 60 as shown in FIG. 4 and expanded in the preforming mold 60 to be formed into the semi-finished saddle body 50 with specific shape.

The aforesaid foamable sheet may be made in a way that the aforesaid mixture of the materials is made into a large foamable board by a machine, and then the foamable board is cut into the foamable sheet with the aforesaid shape and size. Because the foamable board is not yet expanded, the unnecessary parts of the foamable board can be reused after being cut off, so that the waste of material is avoided. Alternately, the aforesaid mixture of the materials may be made into injection material; for example, the mixture may be made into pellets by a pelletizing process. Then, the injection material is made into the foamable sheet with the aforesaid shape and size by injection molding. Alternately, the step a) may be directly performed by foam injection molding. This means the aforesaid mixture of the materials is made into injection raw material, and then the injection raw material, i.e. the foamable material, is injected into the preforming mold 60 and expanded in the preforming mold 60.

The process that the foamable material is expanded and formed into the semi-finished saddle body is performed in a way that the preforming mold 60, which includes an upper die 62 and a lower die 64, is disposed in a foam molding machine (not shown), the upper die 62 and the lower die 64 are connected with each other to form a closed chamber therebetween, and the foamable material is heated and expanded in the closed chamber and shaped into the semi-finished saddle body 50 by the preforming mold 60. In more detail, taking the foamable material including EVA as an example, the foamable material in the preforming mold 60 is heated to 165° C., kept at 165° C. for 15 minutes and then cooled down to the room temperature, so as to be completely expanded and shaped.

b) Perform a thermoforming process to form the semi-finished saddle body 50 into the saddle 10 in a forming mold.

In this embodiment, the saddle 10 includes not only the elastomer 20, but also the cover cloth 30 and the woven cloth 40. Therefore, in the step b) in this embodiment, the semi-finished saddle body 50 is combined with the cover cloth 30 and the woven cloth 40 in the thermoforming process, so that the saddle 10 is provided at the top 12 and the bottom 14 thereof with the cover cloth 30 and the woven cloth 40 respectively.

Figure 5:
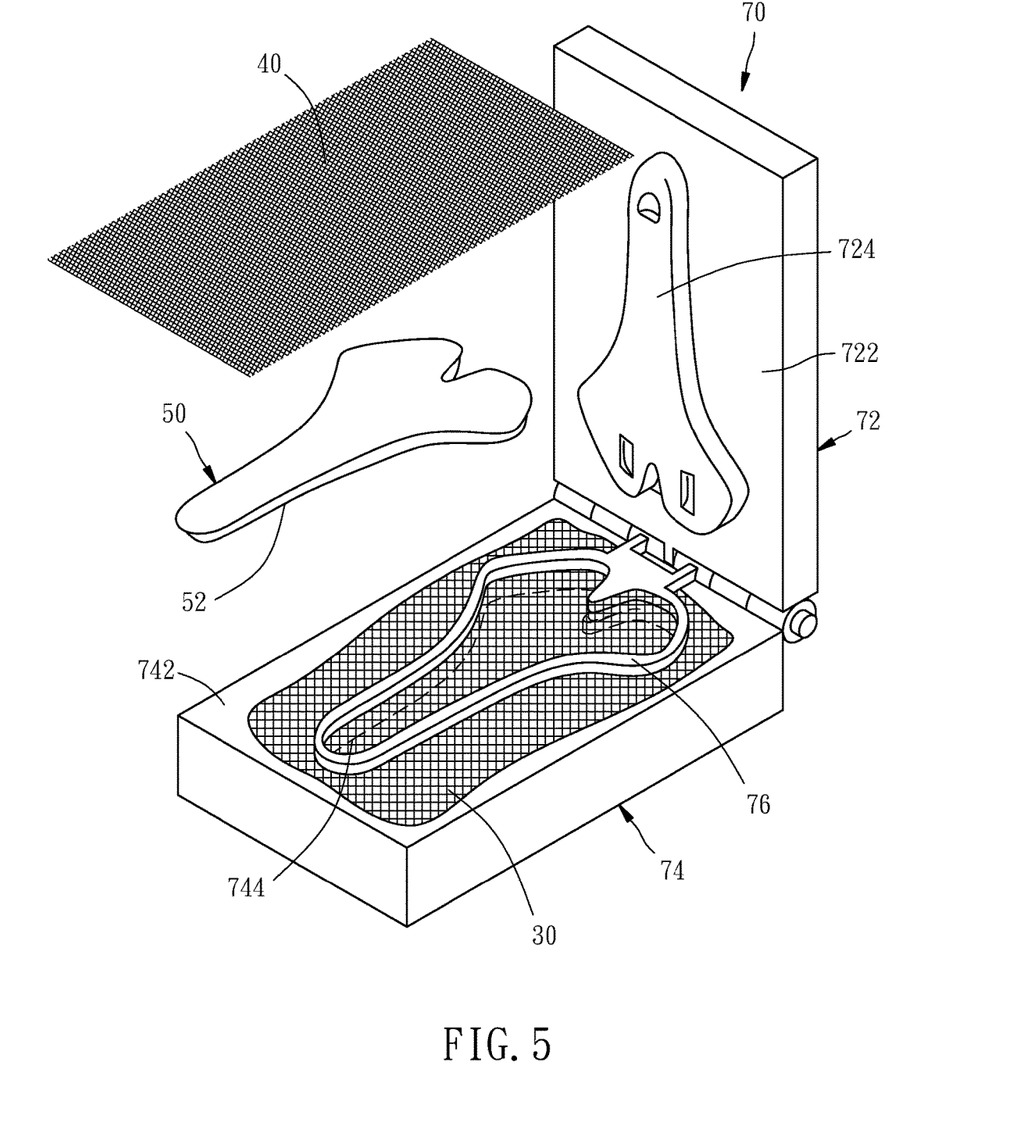
FIG. 5 is an exploded perspective view showing the step b) of the bicycle saddle manufacturing method according to the first preferred embodiment of the present invention.
Figure 6:
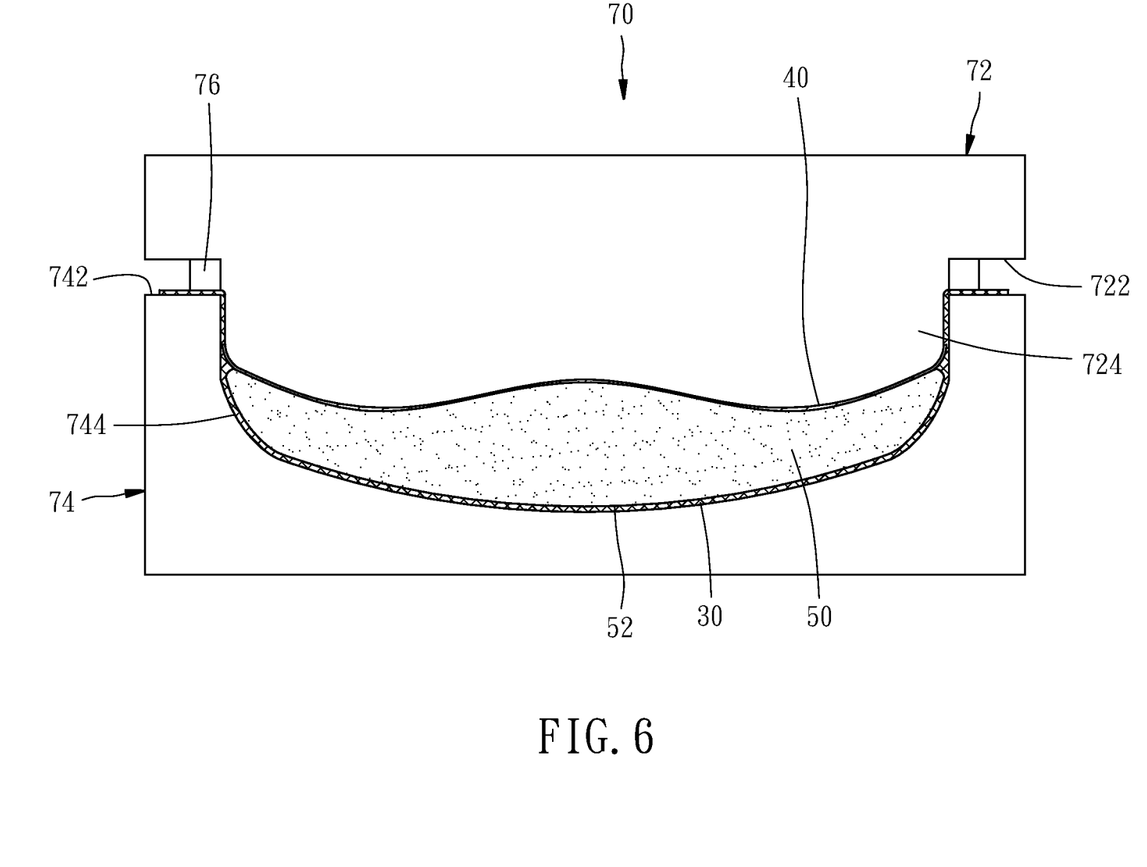
FIG. 6 is a schematic sectional view showing a mold closing state in the step b) of the bicycle saddle manufacturing method according to the first preferred embodiment of the present invention.

As shown in FIG. 5, in the step b) in this embodiment, the semi-finished saddle body 50, the cover cloth 30 and the woven cloth 40 are disposed in a forming mold 70 to perform the thermoforming process. Specifically speaking, the forming mold 70 includes an upper die 72, a lower die 74 and a pressing frame 76, which are matably connected with each other. The upper die 72 has a bottom surface 722, and a protrusion 724 protruded from the bottom surface 722. The lower die 74 has a top surface 742, and a cavity 744 concaved from the top surface 742. The pressing frame 76 is pressed on the top surface 742 of the lower die 74 with the cover cloth 30 disposed therebetween. The cover cloth 30 is positioned on the top surface 742 by the pressing frame 76 and partially located in the cavity 744. The semi-finished saddle body 50 is coated on a top surface 52 thereof with glue, and then put into the cavity 744 in a way that the top surface 52 faces toward the cavity 744. The woven cloth 40 is then arranged to cover the semi-finished saddle body 50 and the pressing frame 76. At last, the upper die 72 is pressed on the pressing frame 76 as shown in FIG. 6, so that the semi-finished saddle body 50 is shaped as the shape defined by the protrusion 724 and the cavity 744 by thermoforming, thereby formed into the saddle 10.

The thermoforming process is performed in a way that the forming mold 70 is disposed in a molding machine (not shown). In more detail, the semi-finished saddle body 50 is heated up to the softening point thereof, such as 150° C. and kept at the softening point for 150-180 seconds, so as to be re-expanded and formed as a specific shape, and then cooled down to the room temperature, so as to be completely thermoformed. While being shaped by the forming mold 70, the semi-finished saddle body 50 is also glued to the cover cloth 30 firmly. Besides, when being softened, the semi-finished saddle body 50 permeates into the small holes of the woven cloth 40. Therefore, when the thermoforming process is accomplished, the woven cloth 40 is combined with the elastomer 20 firmly, thereby enhancing the structural strength of the saddle 10, especially the tensile strength for resisting lateral tensile force.

Figure 7:
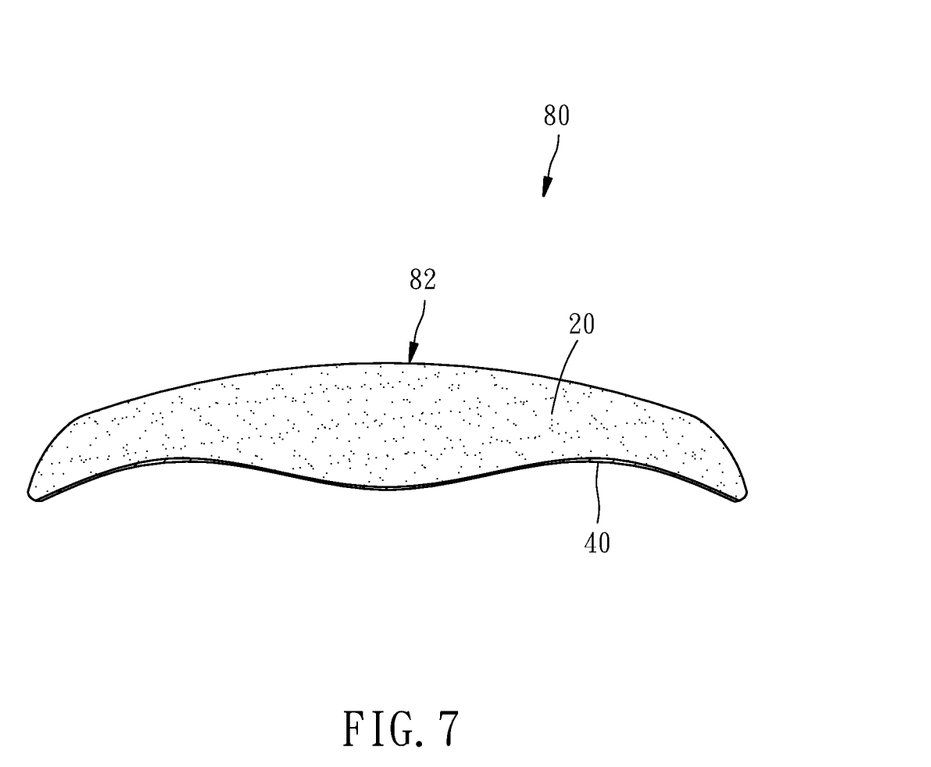
FIG. 7 is a schematic sectional view of a saddle made by a. bicycle saddle manufacturing method according to a second preferred embodiment of the present invention.
Figure 8:
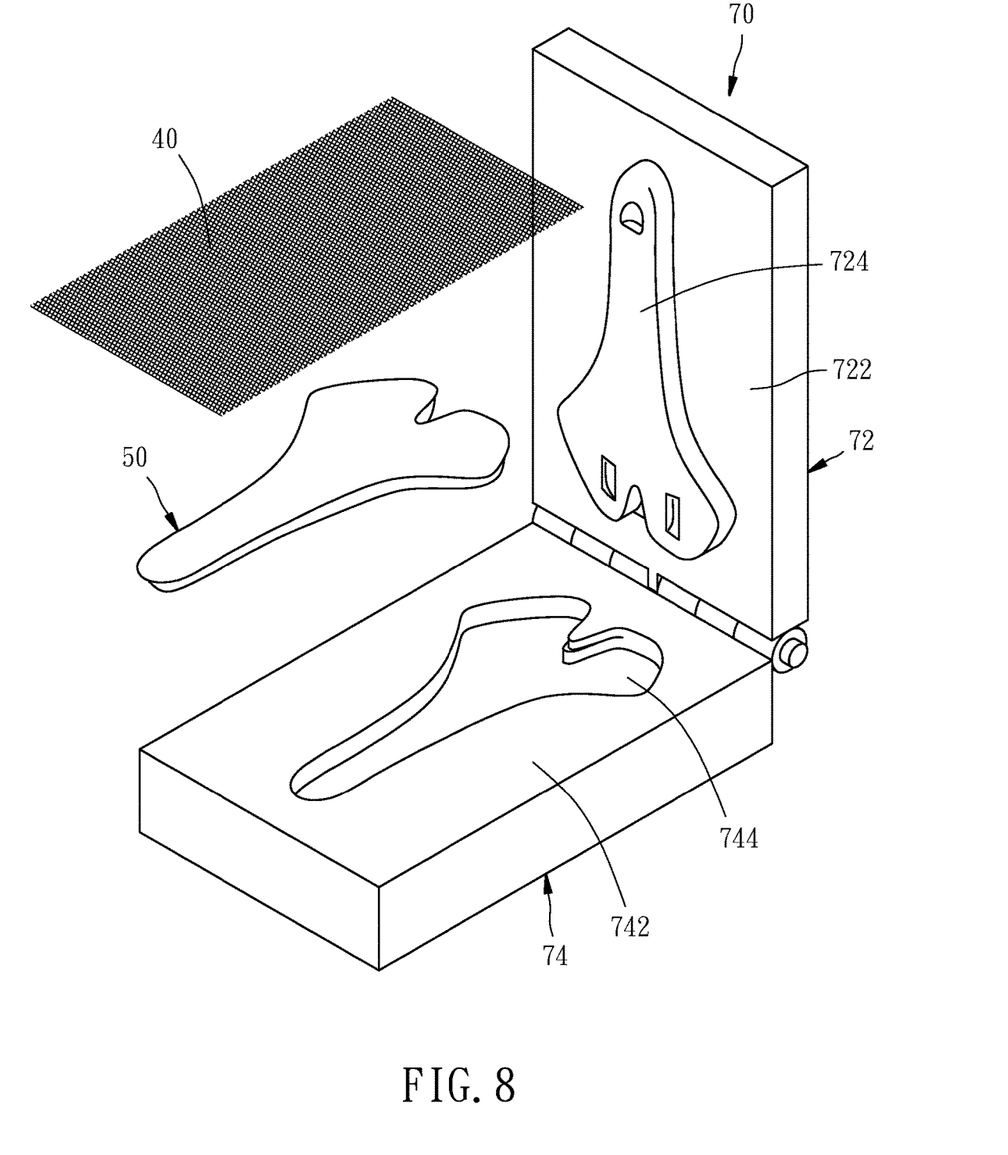
FIG. 8 is an exploded perspective view showing the step b) of the bicycle saddle manufacturing method according to the second preferred embodiment of the present invention.
Figure 9:
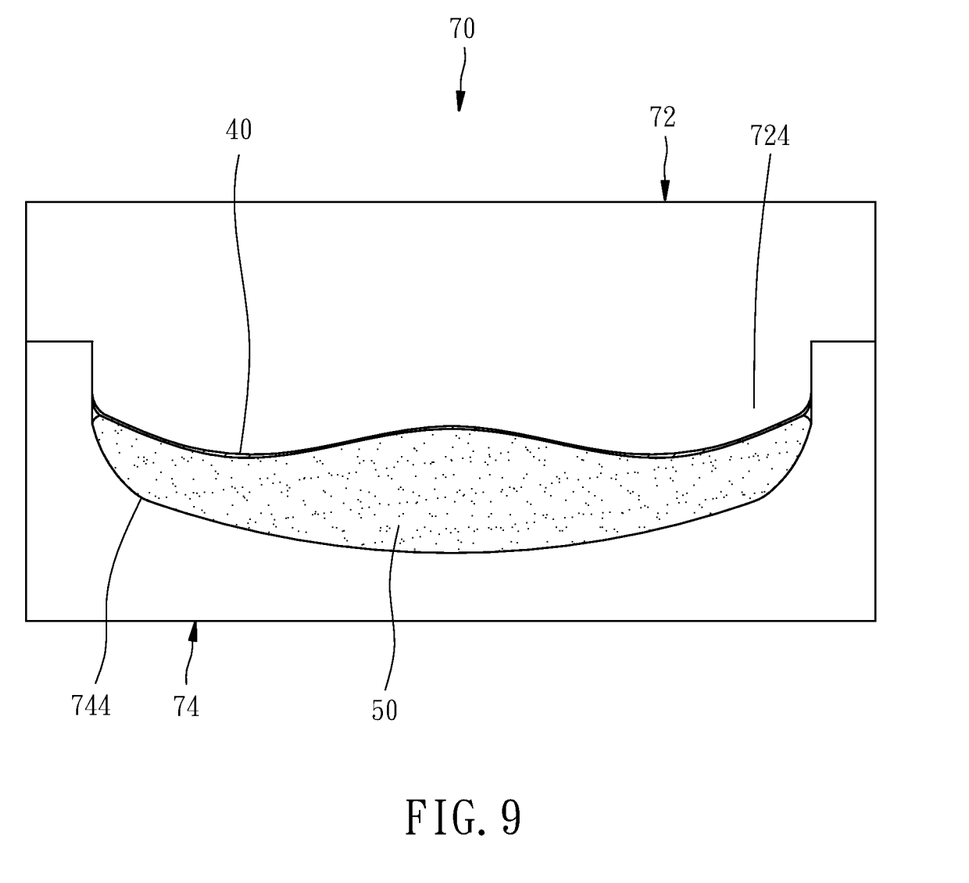
FIG. 9 is a schematic sectional view showing a mold closing state in the step b) of the bicycle saddle manufacturing method according to the second preferred embodiment of the present invention.

Referring to FIGS. 7-9, in a second preferred embodiment of the present invention, a saddle 80 as shown in FIG. 7 is made by a bicycle saddle manufacturing method similar to that as above mentioned. The saddle 80 is provided at the top 82 thereof with no such cover cloth 30 as above mentioned. Therefore, in the step b) of the method of manufacturing the saddle 80, the semi-finished saddle body 50 is only combined with the woven cloth 40 without being combined with the cover cloth 30. Therefore, there is no such cover cloth 30 disposed in the forming mold 70 in the step b), and the forming mold 70 may not have such pressing frame 76 as above mentioned.

After the manufacture of the saddle 80 is accomplished, a cover cloth can be attached on the top 82 of the saddle 80 by the traditional method; alternately, the cover cloth can be provided at the top 82 of the saddle 80 by means of the forming mold 70 as shown in FIG. 5.

Specifically speaking, the semi-finished saddle body 50 in the first preferred embodiment is combined with the woven cloth 40 and the cover cloth 30 simultaneously in a single mold. However, the semi-finished saddle body 50 may be combined with the woven cloth 40 in the forming mold 70 as shown in FIG. 8, and then combined with the cover cloth 30 in another mold similar to the forming mold 70 as shown in FIG. 5. This means the aforesaid step b) may include two sub-steps to form the semi-finished saddle body 50 into the saddle by two times of thermoforming, on that the semi-finished saddle body 50 is combined with the woven cloth 40 in one of the two sub-steps before being combined with the cover cloth 30 in the other of the two sub-steps. Such method is especially suitable and reliable in manufacturing the saddle with relatively more complicated shape.

It should be appreciated that the primary technical feature of the bicycle saddle manufacturing method of the present invention lies in that the semi-finished saddle body 50 for forming the elastomer 20 is not made by cutting an expanded foam block into a specific shape by machining. The semi-finished saddle body 50 in the present invention is made in a way that the foamable material, which is not yet expanded, is directly expanded and formed into the semi-finished saddle body 50 with the required shape, so that the waste of material and environmental pollution are avoided in the present invention. Therefore, the disposal of the cover cloth and the woven cloth may not be included in the bicycle saddle manufacturing method of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following

What is claimed is:

1. A bicycle saddle manufacturing method comprising the steps of:
   a) preparing a preforming mold with a closed chamber;
   b) disposing an ethylene-vinyl acetate (EVA) material in the closed chamber of the preforming mold, heating the EVA material to 165° C. and keeping it at the temperature for 15 minutes and then cooling down to the room temperature to form the EVA material into a semi-finished saddle body;
   c) preparing a forming mold, the forming mold including an upper die and a lower die, the upper die having a bottom surface, and a protrusion protruded from the bottom surface, the lower die having a top surface, and a cavity concaved from the top surface;
   d) removing the semi-finished saddle body from the preforming mold and putting the semi-finished saddle body into the cavity of the forming mold;
   e) arranging a woven cloth to cover the semi-finished saddle body and pressing the upper die on the top surface of the lower die to cover the woven cloth on the semi-finished saddle body; and
   f) heating up the forming mold 150° C. to a softening temperature of the semi-finished saddle body and keeping it at the temperature for 150-180 seconds to soften the semi-finished saddle body to permeate into the small holes of the woven cloth and to re-expand the semi-finished saddle body to form into a saddle shaped as the shape defined by the protrusion and the cavity.

2. The bicycle saddle manufacturing method as claimed in claim 1, wherein the EVA material used in the step b) is made by injection molding.

3. The bicycle saddle manufacturing method as claimed in claim 1, wherein the EVA material used in the step b) is cut from an EVA board which is not yet expanded.

4. The bicycle saddle manufacturing method as claimed in claim 1, wherein the EVA material disposed in the closed chamber of the preforming mold in the step b) is an EVA sheet which is not yet expanded.

5. The bicycle saddle manufacturing method as claimed in claim 1, wherein the forming mold further comprises a pressing frame rotatably connected with the upper die and the lower die, and in the step c) further comprises pressing the pressing frame on the top surface of the lower die with a cover cloth disposed therebetween, the cover cloth being positioned on the top surface by the pressing frame and partially located in the cavity.

* * * * *